(12) United States Patent
Chechan et al.

(10) Patent No.: US 8,999,467 B2
(45) Date of Patent: Apr. 7, 2015

(54) CURED COATING FOR USE IN OPTICS OR ELECTRONICS

(75) Inventors: Nicolas Chechan, Paris (FR); Matthieu Dhenaut, Chartres (FR); Virginie Mercier, Eindhoven (NL); Marcel Rene Bohmer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2176 days.

(21) Appl. No.: 12/064,086

(22) PCT Filed: Aug. 18, 2006

(86) PCT No.: PCT/IB2006/052860
§ 371 (c)(1),
(2), (4) Date: Feb. 19, 2008

(87) PCT Pub. No.: WO2007/023434
PCT Pub. Date: Mar. 1, 2007

(65) Prior Publication Data
US 2008/0309212 A1    Dec. 18, 2008

(30) Foreign Application Priority Data
Aug. 22, 2005    (EP) .................................... 05300685

(51) Int. Cl.
| | | |
|---|---|---|
| C09D 183/05 | (2006.01) |
| H01J 5/16 | (2006.01) |
| B05D 3/00 | (2006.01) |
| H01J 9/20 | (2006.01) |
| G02B 1/10 | (2006.01) |
| G02B 5/20 | (2006.01) |
| H01J 61/40 | (2006.01) |

(52) U.S. Cl.
CPC ... *H01J 9/20* (2013.01); *G02B 1/10* (2013.01); *G02B 5/206* (2013.01); *H01J 61/40* (2013.01)

(58) Field of Classification Search
CPC .......... C08L 83/04; G02B 1/10; G02B 5/206; H01J 61/40; H01J 9/20
USPC .................. 428/35.7, 447; 427/331; 313/112; 106/287.11
See application file for complete search history.

(56) References Cited

U.S. PATENT DOCUMENTS

| | | | |
|---|---|---|---|
| 5,731,091 A * | 3/1998 | Schmidt et al. ............... 428/428 |
| 6,156,388 A | 12/2000 | Endres et al. |
| 6,510,995 B2 | 1/2003 | Muthu et al. |
| 7,045,937 B2 | 5/2006 | Boehmer et al. |

(Continued)

FOREIGN PATENT DOCUMENTS

| | | |
|---|---|---|
| JP | 7331178 A | 12/1995 |
| JP | 2000204260 A | 7/2000 |

(Continued)

OTHER PUBLICATIONS

John D. Wright; "Sol-Gel Materials Chemistry and Applications", Taylor & Francis Group, ISBN: 9056993267, vol. 4, 2001.

*Primary Examiner* — Gwendolyn Blackwell
*Assistant Examiner* — Yan Lan
(74) *Attorney, Agent, or Firm* — Yuliya Mathis (57) ABSTRACT

The present invention relates to cured coatings comprising: at least one filler, a polyalkoxysilane matrix, and at least one cured aminosilane in an amount between 5.5 to 40.0 wt % of the total weight of the cured coating. These cured coatings can be used in optics or electronics, and in devices such as lamps.

17 Claims, 6 Drawing Sheets

(56) References Cited

U.S. PATENT DOCUMENTS

2005/0064208 A1* 3/2005 Boehmer et al. .............. 428/447
2005/0169006 A1   8/2005 Wang et al.

FOREIGN PATENT DOCUMENTS

| | | | |
|---|---|---|---|
| JP | 2002146285 A | 5/2002 |
| JP | 2005502986 A | 1/2005 |
| JP | 2005516248 A | 6/2005 |
| WO | 0120641 A1 | 3/2001 |
| WO | 03023816 A2 | 3/2003 |
| WO | 03063197 A1 | 7/2003 |
| WO | 2004044487 A2 | 5/2004 |
| WO | 2005045883 A2 | 5/2005 |

\* cited by examiner

CURED COATING FOR USE IN OPTICS OR ELECTRONICS

FIELD OF THE INVENTION

The present invention relates to cured coatings for use in fields like optics or electronics, and to devices comprising same.

BACKGROUND OF THE INVENTION

Colored coatings are known in the art. For example WO 03/023816 and WO 04/044487 disclose lamp vessels provided with a light absorbing coating.

When a coating is applied on a substrate, said substrate may not be perfectly clean. The presence of particles, even of chemically inert particles, creates some very localized stresses around said particles and leads to micro-cracks, which can rapidly spread throughout the coating. Some sol-gel-containing coatings can handle particle-induced stress without crack spreading. In the industry, a wide range of elements can contaminate substrates. In the presence of such contaminants on a substrate, adhesion between coating and substrate is dramatically decreased. Contaminants may also create additional stresses which cannot be handled by conventional sol-gel coatings. These effects can lead to macro-cracks and peeling off, particularly when said coating is subjected to temperature variations. In addition, many contaminants (for example Zn, Cl, Sn, Na, Ca, W, glycerin or organic resins like rosin/colophony) are not chemically inert with respect to the substrate and/or the coating. They induce new physical and/or chemical mechanisms and phenomena, which lead to additional stresses and poor adhesion. For instance, said contaminants can locally modify the pH of a coating, induce modifications of matrix structure, or simply react with compounds of the coating itself, modify the stochiometry required for proper matrix formation. As the coating is locally modified, its structure is not homogeneous and additional stresses are generated.

Moreover, some substrates exhibit a relatively low —OH and —O. density on their surface. In some cases, this is due to a prior surface treatment. Such a low —OH and —O. density generally does not favour coating adhesion.

SUMMARY OF THE INVENTION

The present invention relates to a cured coating, for instance for use in optics or electronics, wherein said cured coating comprises:
at least one filler,
a polyalkoxysilane matrix, and
5.5-40.0% of at least one cured aminosilane.

Unless otherwise stated, percentages (%) refer to amounts by weight based upon total weight of the cured coating.

Within the context of the present invention, filler is meant to encompass any filler known in the art. Examples of fillers include inorganic fillers, pigments, and mixtures thereof. Examples of inorganic fillers include silica $SiO_2$, titania $TiO_2$, carbon black or alumina $Al_2O_3$.

If said filler comprises a pigment, the cured coating of the invention is a light-absorbing coating (coloured coating).

Within the context of the present invention, pigment is meant to encompass any pigment known in the art. Examples thereof include organic pigments, inorganic pigments, and mixtures thereof. In one aspect of the invention, the pigment is selected from the group consisting of iron oxides, iron oxides doped with phosphor, zinc-iron oxides, cobalt aluminate, neodymium oxide, bismuth vanadate, zirconium praseodymium silicate or mixtures thereof. Iron oxide ($Fe_2O_3$) is an orange pigment and P-doped $Fe_2O_3$ is an orange-red pigment. Zinc-iron oxides, for example $ZnFe_2O_4$ or $ZnO.ZnFe_2O_4$, are yellow pigments. Mixing (P-doped) $Fe_2O_3$ with $ZnFe_2O_4$ yields a layer of a deep orange colour. Cobalt aluminate ($CoAl_2O_4$) and neodymium oxide ($Nd_2O_5$) are blue pigments. Bismuth vanadate ($BiVO_4$), also referred to as pucherite, is a yellow-green pigment. Zirconium praseodymium silicate is a yellow pigment. Examples of organic pigments include Anthraquinone pigments, Azo pigments, Isoindoline pigments, Perylene pigments, Perynone pigments, Pyrazolone pigments, Thioindigo pigments, Triarylmethane pigments . . . For instance, Chromophtal yellow (or Bis[4,5,6,7-tetrachloro-3-oxoisoindoline-1-ylidene]-1,4-phenylenediamine; chemical formula $C22H_6C18N4O2$ and constitution number C.I.=56280), Chromopthal Red A2B (or [1-1'Bianthracene]-9,9',10,10'-tetrone, 4,4'-diamino-(TSCA, DSL); C.I.=65300), or yellow anthraquinone (or 1,1'-[(6-phenyl-1,3,5-triazine-2,4-diyl)diimino]Bis-; chemical formula C37H21N5O4; C.I.=60645), . . . .

Said filler is generally in the shape of particles. Said particles can have various sizes. Said filler can be present in the various amounts, up to 75% in volume of the final cured coating. The exact amount of filler may depend upon the exact application, technical purpose and size of filler particles. The skilled person would know how to select said at least one filler, and to determine the amount thereof, based upon the desired colour and/or the desired mechanical properties.

Polyalkoxysilane matrixes are known to those skilled in the art. Within the context of the present invention, said matrix can be derived from alkoxides Si(OR)n or oxoalkoxides SiO(OR)n (R=saturated or unsaturated organic group, alkyl or aryl), beta-diketonates Si(beta-dik)n (beta-dik=RCOCHCOR') or carboxylates Si(O2CR)n. In one aspect said R or R' group can be a C1-C10 alkyl, preferably a C1-C6 alkyl, for example a C1-C4 alkyl group, or a phenyl group. In another aspect, n can be any integer between 1 and 4, for example 4 like in the case of TEOS, 3 like in the case of MTMS, or 2 or 1 like in the case of a beta-diketonate.

In one aspect of the invention, said polyalkoxysilane matrix is derived from at least one selected from the group consisting of tetraethoxysilane (TEOS), methyltrimethoxysilane (MTMS), methyltriethoxysilane (MTES), phenyltrimethoxysilane (PTMS), and phenyltriethoxysilane (PTES). Generally, said filler is dispersed within said matrix.

The cured coating of the invention comprises 5.5-40.0% of at least one cured aminosilane. According to the invention, said cured coating can comprise 5.5-35.0%, 5.5-30.0%, 5.5-25.0%, 5.5-20.0%, 5.5-15.0%, 5.5-14.0%, 5.5-13.0%, 5.5-12.0%, 5.6-11.0%, 5.6-10.0%, 5.7-9.5%, 5.7-9.0%, 5.8-8.5%, 5.8-8.0%, 5.9-7.5%, 5.9-7.0%, 5.9-6.9%, of at least one cured aminosilane. Within the context of the present invention, aminosilane is meant to encompass any amine-functionalized alkoxysilane.

Said aminosilane can have one or more amino groups. According to one aspect of the invention, said aminosilane can be selected from the group consisting of x-alkyl-aminopropyltrialkoxysilanes and mixtures thereof. In one aspect, said alkyl is a C1-C10, or a C1-C6 alkyl group. In another aspect, said alcoxy is a C1-C10 or a C1-C6 alcoxy group. In a further aspect, said alkyl group can be a methyl-, ethyl- or phenyl-group; and the alcoxy group can be a methoxy or an ethoxy group; x is selected from the group consisting of 0, 1, and 2.

Examples of aminosilanes within the context of the present invention also include:
(N,N-dimethylaminopropyl)trimethoxysilane (2 Me-APTMS),
(N,N-dimethylaminopropyl)triethoxysilane (2 Me-APTES),
N-(2-Aminoethyl)(3-aminopropyl)trimethoxysilane:

In one aspect, the cured coating of the invention can be in the form of a uniform or non-uniform layer. For example, said layer can be about 1 to 5 μm thick in average, e.g. 2-4 or 2-3 μm.

The invention further relates to a cured coating, for instance for use in optics or electronics, wherein said cured coating has an occurrence of cracks wider than 1 mm, of less than 20% after the Fakra test. Preferably, said coating has an occurrence of cracks wider than 1 mm, of less than 15%, 10% or even 5% after the Fakra test. The Fakra test, which was developed by the Bosch Company, is a thermal cycling ageing test for coatings. Ambient temperature goes from 40° C. to +80° C. in 24 hours, and relative humidity is set to 93% when temperature is above 0° C. Such a 24-hour cycle is repeated 10 times. When products are lamps, they are operated during half of the test. This test is described in greater details in the 2004 Amendment 3 of IEC60809. The Fakra test is an example of coating test, but many other tests, including "tape test" or thermal shock tests, are also well-know to evaluate coating adhesion or stress, and the cured coatings of the invention would similarly show the improvements and advantages within the framework of these performance tests.

In another aspect, the present invention relates to a cured coating, for instance for use in optics or electronics, wherein said cured coating has an occurrence of peeling-off wider than 1 mm, of less than 20% after the Fakra test. Preferably, said cured coating has an occurrence of peeling-off wider than 1 mm, of less than 15%, 10%, or even 5% after the Fakra test.

In a further aspect, the invention relates to a cured coating, for instance for use in optics or electronics, wherein said cured coating has an occurrence of peeling-off wider than 1 mm, and an occurrence of cracks wider than 1 mm, of both less than 20% after the Fakra test. Preferably, both occurrences are below 15%, 10%, or even 5%.

The present invention also relates to a process for providing a cured coating according to the invention onto a substrate. Said process comprises the steps:
Providing at least one substrate,
Providing at least one polyalkoxysilane sol-gel hydrolysis mixture,
Providing at least one filler, e.g. as a filler dispersion,
Providing at least one aminosilane, in an amount such that the cured coating contains 5.5-40.0% of said cured aminosilane,
Mixing said aminosilane and said filler,
Mixing the resulting mixture with said sol-gel hydrolysis mixture,
Coating said substrate with the resulting mixture, and
Curing.

The skilled person is familiar with sol-gel chemistry, and would know how to prepare a polyalkoxysilane sol-gel matrix. For example, a polyalkoxysilane hydrolysis mixture can be prepared by mixing at least one sol-gel polyalkoxysilane precursor, water, at least one acid and at least one alcohol. The skilled person would know how to choose the ingredients and the respective amounts thereof. In this respect, guidance can be found in "Sol-Gel Materials: Chemistry and Applications", Taylor & Francis Group, ISBN: 9056993267.

Said filler can be provided as part of a filler dispersion. Said filler dispersion can be obtained by mixing a finely-divided filler in a water/alcohol mixture, optionally in the presence of a dispersant, for example one of the Disperbyk® family (Byk Chemie), TEGO® Dispers (Degussa), DISPEX® or EFKA® (Ciba).

The aminosilane is then added to said filler dispersion. The amount of aminosilane is chosen as to result in a cured coating containing 5.5-40.0% of said cured aminosilane. The skilled person would know how to compute the amount of aminosilane required, taking into account the cured ratios for each of the ingredients used for preparing the cured coating of the invention.

Aminosilanes can lead to basic pH values. Therefore, if a filler is pH sensitive, it may be required to neutralize or acidify said aminosilane prior to adding it to the filler dispersion.

The mixture of filler, aminosilane and hydrolysis mixture can be applied onto a substrate following coating methods known in the art. Examples of such methods include, but are not limited to, spray coating, dip coating, spin coating, flow coating, roll/gravure coating, capillary coating, and printed coating. The cured coating of the invention can be provided onto a great variety of substrates, including metal, glass, plastics, ceramics, fibrous material like wood or glass fibres, leather . . . . Subsequent curing under standard conditions leads to the cured coating of the invention. The skilled person would know how to select suitable curing conditions. Examples of curing conditions include: 220° C. for 20 minutes; 250° C. for 10 minutes; or 270° C. for 5 minutes.

The cured coating of the invention is useful in various fields, including the optics and the electronics fields. The cured coating of the invention is useful in the field of optics, as light-absorbing layers. In one embodiment, said cured coating is provided on an optical device for generating a 'coloured light', e.g. a red or yellow light. Said optical device is useful, for example, in the automotive industry. The invention thus also relates to a device for use in optics, wherein at least part of the device is provided with at least one cured coating according to the invention. Said device can comprise at least one light-transmitting part. Said device can also comprise a light-reflecting part. For example, said device can be a lamp vessel or a bulb at least partially provided with at least one cured coating according to the invention.

The cured coating of the invention is resistant to high temperatures, exhibits high adhesion levels to substrates, and has reduced stress, and thus, achieves a dramatic decrease in the occurrence of coating defects, in particular in the occurrence of macro-defects (macro-cracks and macro peeling-off) . These advantages are clearly demonstrated using the Fakra test for assessing coating endurance, or further performance tests like "tape test" or thermal shock tests. The decreased tendency to peel-off is especially advantageous for coating substrates which are not perfectly clean, i.e. which exhibit surface defects, e.g. which bear contaminants, and/or for coating substrates which show a relatively low —OH and —O. density on their surface.

The advantages of the invention will become apparent from the following examples, which are given below as mere illustrations, and are non limitative.

The skilled person will appreciate that the present invention can incorporate any number of the preferred features described above.

DESCRIPTION OF PREFERRED EMBODIMENTS

EXAMPLES

Coating Preparation A: in Accordance with WO 01/20641 (No Aminosilane)

A quantity of 10 g ZnFe2O4 (particle size 70 nm) is dispersed in a 50/50% water/ethanol mixture, using "Disperbyk 190™" as the dispersing agent. The overall weight of the mixture is 30 g. By means of wet ball milling using 2 mm zirconium oxide grains, an optically clear liquid is obtained.

A quantity of 3 g Fe2O3 (particle size 40 nm) is dispersed in a corresponding manner.

A hydrolysis mixture of 40 g methyltrimethoxy silane (MTMS), 0.6 g tetraethylorthosilicate (TEOS), 32 g water, 4 g ethanol and 0.15 g glacial acetic acid is stirred for 48 hours at room temperature and, subsequently, stored in a refrigerator.

A coating liquid is prepared by mixing 10 g of said ZnFe2O4 dispersion, 6 g of the Fe2O3 dispersion and 10 g of the MTMS/TEOS hydrolysis mixture with 4 g methoxy-propanol, which coating liquid is subsequently spray coated onto the outer surface of the major part of a lamp vessel. The coating is cured for 10 minutes at a temperature of 250° C. In this manner, a light-absorbing coating in a thickness up to 3 μm is obtained on a glass lamp vessel without crack formation during drying and curing.

Coating Preparation B: Coatings with Various Aminosilane Contents

A ZnFe2O4 dispersion, a Fe2O3 dispersion and an MTMS/TEOS hydrolysis mixture are prepared as indicated for Coating preparation A.

A pigmented liquid is prepared by mixing 10 g of the ZnFe2O4 dispersion, 6 g of the Fe2O3 dispersion. Then, "z" grams of acetic acid are mixed for 1 minute in this mixture, and "x" grams of N-(2-Aminoethyl)(3-aminopropyl)trimethoxysilane are added and stirred for 2 minutes.

Finally, a coating liquid is prepared by mixing this pigmented liquid with "y" g of the MTMS/TEOS hydrolysis mixture and 4 g of methoxy-propanol.

The resulting sol-gel is subsequently applied in the same way as for Coating Preparation A, and Cured in the Same Conditions.

The value of "y" depends on that of "x", in order to keep the same pigment content and colour.

The value of "x" is directly linked to the desired amount of aminosilane, expressed in weight % in the final cured coating.

Thus, both "x" and "y" can be calculated according to required design.

The value of "z" cannot be anticipated because it depends of the quality of aminosilane available, so it should be determined before the preparation. It can be determined by adding the acid after the aminosilane, drop by drop, until the pigmented solution pH reaches 5. Once this amount is determined, the pigmented liquid has to be prepared again properly, by adding all the acid just before the aminosilane.

The table below gives the values of "x" and "y" for some aminosilane contents (AS) which corresponds to test results presented below.

| x(g) | y(g) | AS (% wt) |
|------|------|-----------|
| 0 | 10 | 0.0 |
| 0.79 | 8 | 4.1 |
| 1.13 | 7 | 5.9 |
| 1.25 | 6.7 | 6.5 |
| 1.32 | 6.5 | 6.9 |

Further cured coatings according to the invention can be prepared following the above procedure, with varying aminosilane contents, and/or with further aminosilane compounds. The skilled person would know how to prepare such cured coatings.

The coatings of the invention all exhibit a very good adhesion onto a large range of substrates, and minimize the incidence of cracks and "peeling off" regions, especially after performance tests such as the Fakra test.

Substrates

Coating is performed on two types of substrates: substrates "L1" and "L2". "L1" and "L2" are glass substrates with same kind of contaminants. On "L2", an additional coating has been provided. Both substrates "L1" and "L2" have a poor quality surface, i.e. their surface is contaminated and exhibits a low Si—OH/Si—O. density.

Testing

Various samples are prepared and tested in a coating endurance test, namely the Fakra test (Bosch company), which is a common reference in the industry. For each sample, the evaluation involves determining the number of cracks and of regions peeling off on the coating.

Results for Substrate "L1"

Several samples of substrate "L1" have been coated with 3 different coatings having various aminosilane contents (AS):

8 samples with a cured coating containing 0% AS
8 samples with a cured coating containing 4.1% AS
10 samples with a cured coating containing 6.5% AS.

Figure 1:
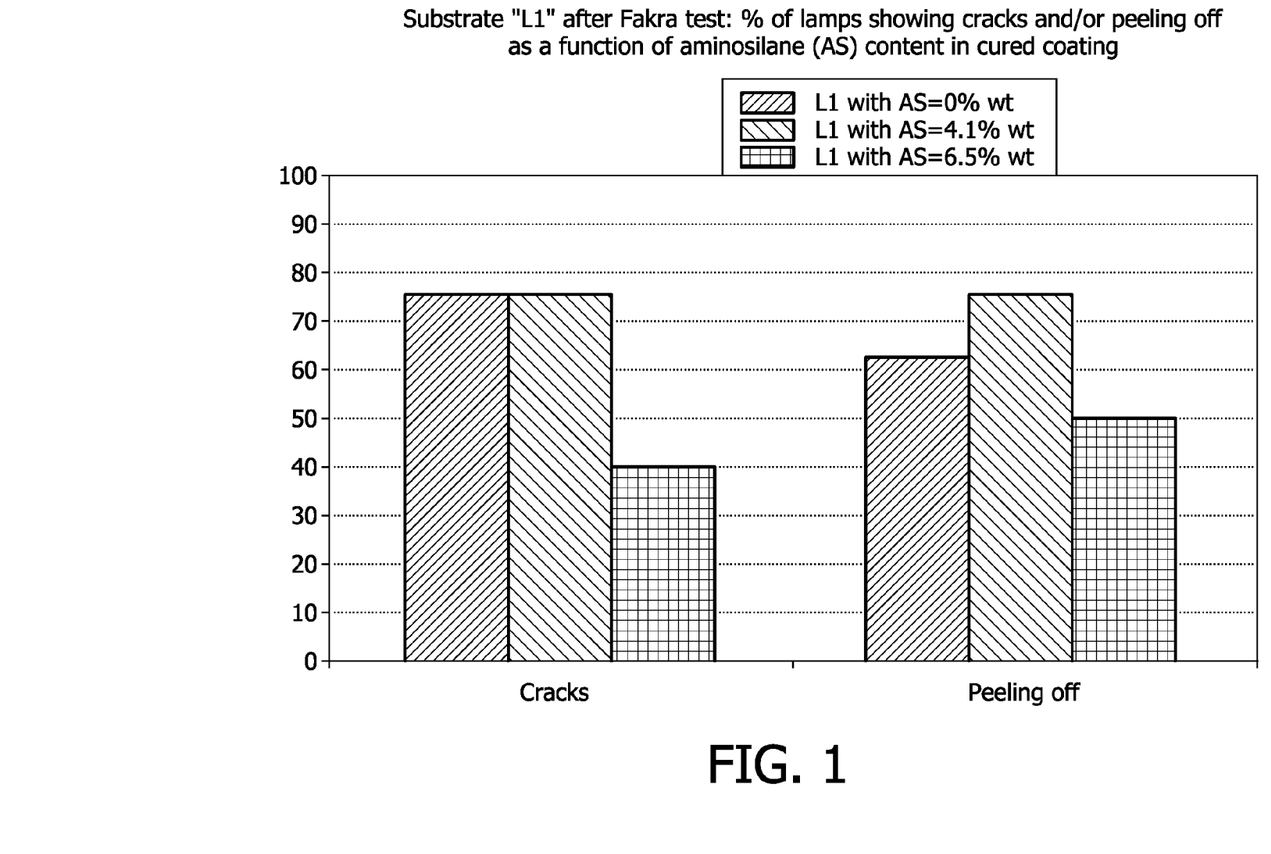
FIGS. 1 and 2 show comparative data obtained by testing various coatings on substrate "L1".

FIG. 1 shows the results obtained with substrate "L1" by scoring all kind of cracks and peeling-off, including very small ones, only visible with a ×10 magnifier.

Figure 2:
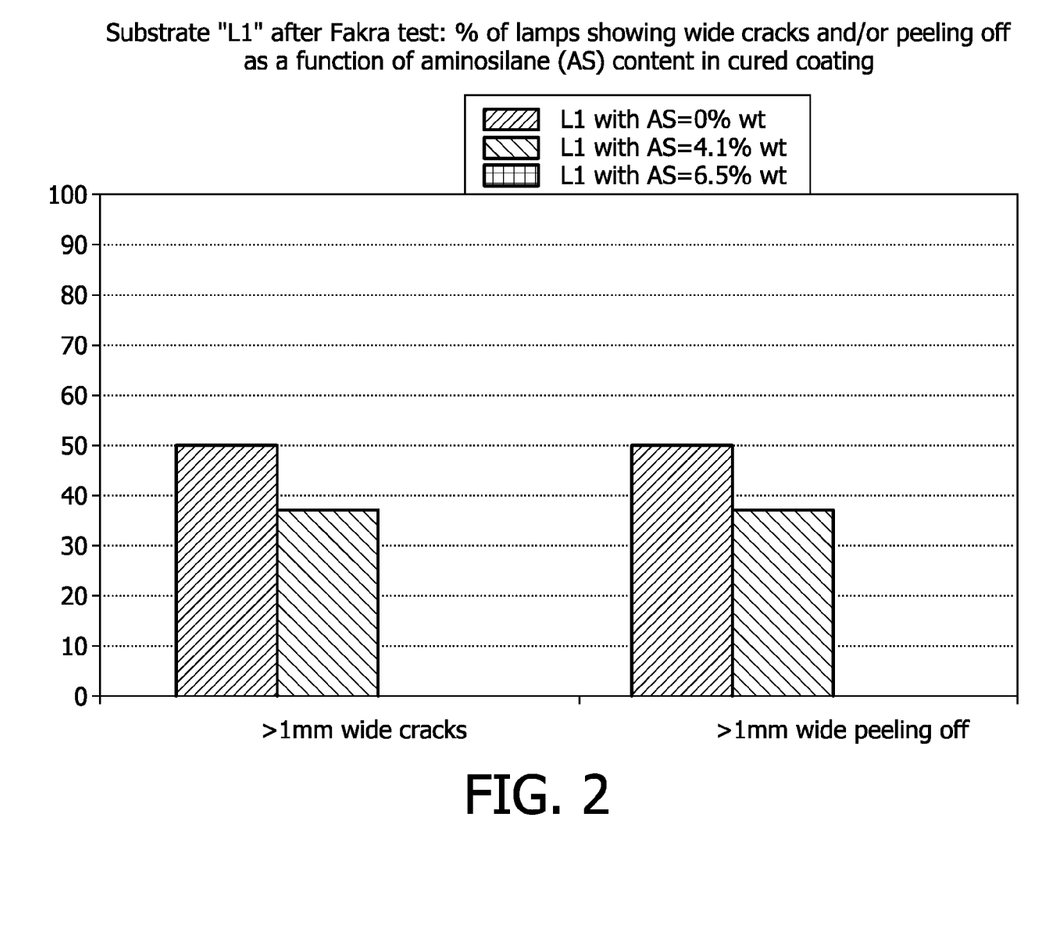

FIG. 2 shows the results obtained with substrate "L1" by scoring the 'large' defects, i.e. cracks and peeling-off when their largest dimension is greater than 1 mm (micro-cracks and micro-peeling-off are not taken into account).

Results for Substrate "L2"

Several samples of substrate "L2" have been coated with 3 different coatings having various aminosilane contents (AS):

10 samples with a cured coating containing 0% AS
10 samples with a cured coating containing 5.9% AS
10 samples with a cured coating containing 6.9% AS.

Figure 3:
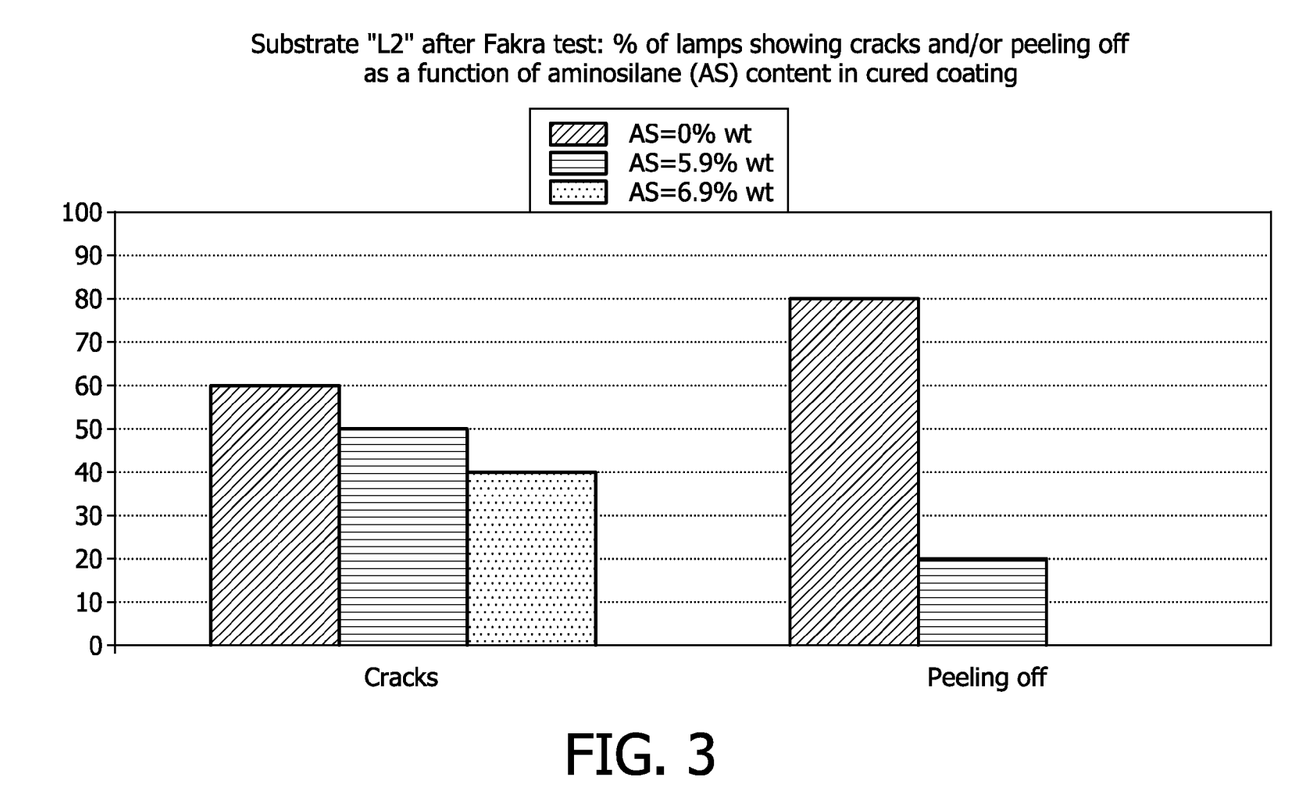
FIGS. 3 and 4 show comparative data obtained by testing various coatings on substrate "L2".

FIG. 3 shows the results obtained with substrate "L2" by scoring all kind of cracks and peeling-off, including very small ones, only visible with a ×10 magnifier.

Figure 4:
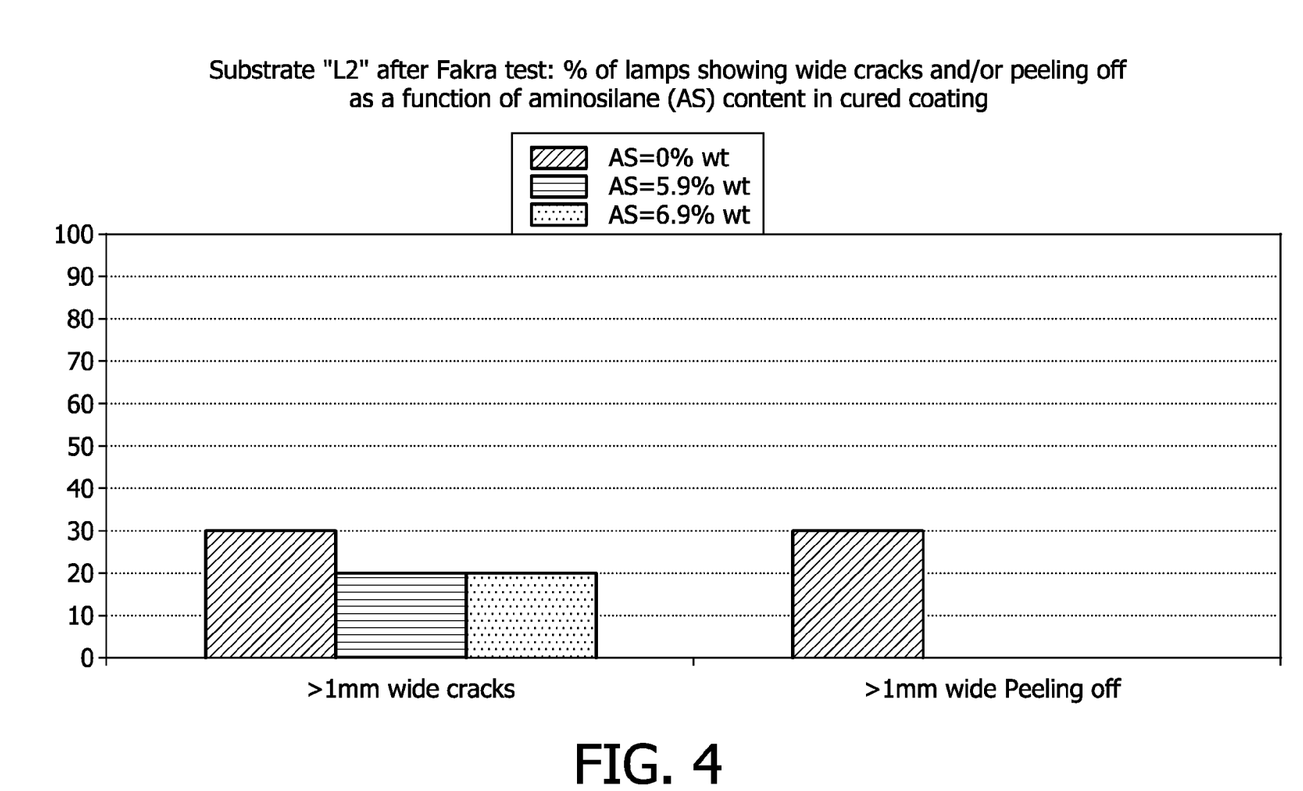

FIG. 4 shows the results obtained with substrate "L2" by scoring the 'large' defects, i.e. cracks and peeling-off when their largest dimension is greater than 1 mm (micro-cracks and micro-peeling-off are not taken into account).

These results demonstrate the advantages of the cured coatings of the invention, which exhibit a dramatically reduced occurrence of defects, especially macro-defects like cracks and peeling-off wider than 1 mm. These advantages are observed on two types of substrates: "L1" and "L2".

Figure 5:
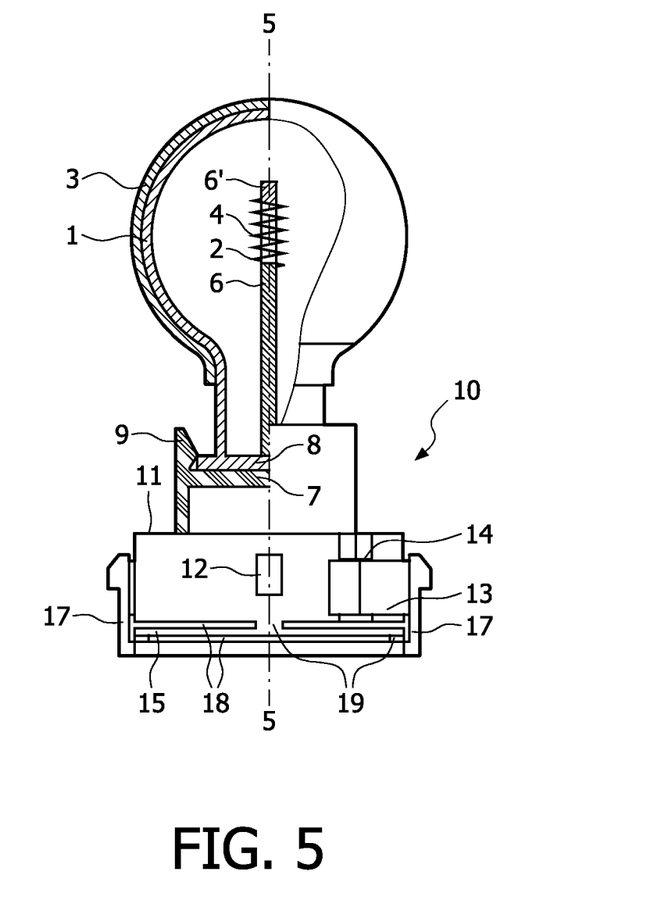
FIG. 5 is a side view, partly cut away and partly in cross-section, of an electric lamp in accordance with the invention comprising a lamp cap.
Figure 6:
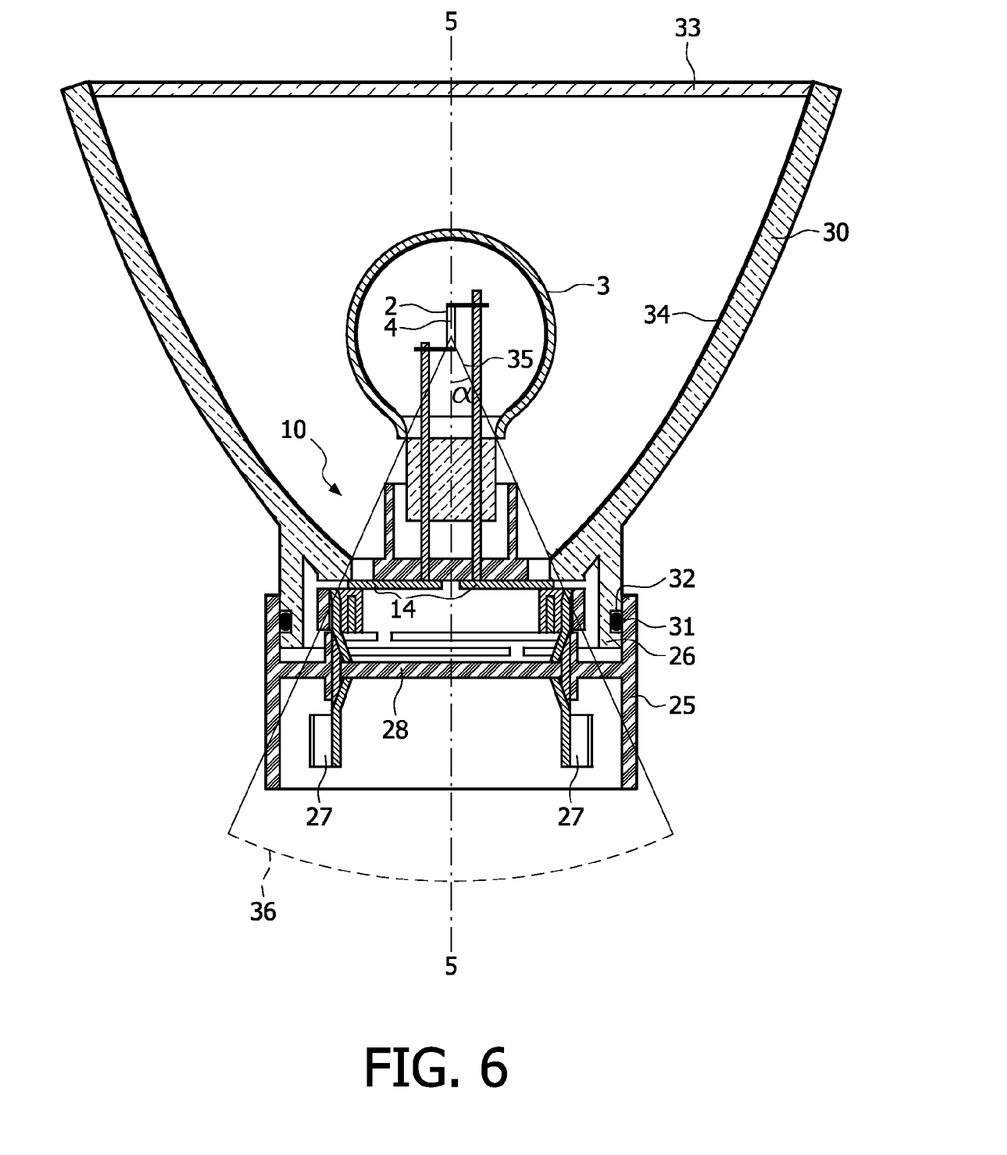
FIG. 6 shows an electric lamp provided with a reflector and an adapter.

FIGS. 5 and 6 are purely schematic and not drawn to scale. Particularly for clarity, some dimensions are exaggerated strongly. In the Figures, like reference numerals refer to like parts whenever possible.

FIG. 5 shows an electric lamp in accordance with the invention, a part of which is shown in a side view, partly cut away, and another part of which is shown in cross-section. The electric lamp comprises a light-transmitting lamp vessel 1, for example made of glass, which is closed in a gastight manner and in which an electric element 2, being a (spiral-shaped) tungsten incandescent body with a centre 4 in the Figure, is axially positioned on an axis 5 and connected to current conductors 6 which issue from the lamp vessel to the exterior. The lamp shown has a filling of an inert gas, for example an Ar/Ne mixture, with a filling pressure slightly above 5 bar.

A lamp cap 10 is firmly connected to the lamp vessel 1. The lamp cap 10 has a synthetic resin housing 11. The housing 11 comprises a flat base portion 7 at least substantially perpendicular to the axis 5. The lamp vessel 1 is sealed in a gastight manner by means of a plate 8 of an insulating material, which plate lies in a plane at least substantially perpendicular to the axis 5. Electric element 2 is mounted in a previously defined position with respect to the plate 8 during the manufacture of the lamp. The plate 8 of the lamp vessel 1 is pressed home against the base portion by locking means 9, for example ridges, such that the electric element 2 will take up a previously defined position with respect to the reference means 12, for example studs. The studs 12 form part of the lamp cap and are designed to abut against a support 30, for example a reflector, as is visible in FIG. 6.

The lamp cap also comprises contact members 14 which are provided with a screen 13 and to which the current conductors 6 of the lamp vessel 1 are connected. A resilient intermediate portion 15, which is provided with coupling means 17, i.e. resilient tags in the Figure that are designed for coupling the reflector to the lamp cap, forms one whole with the housing 11. The resilient action of the intermediate portion is obtained in that the intermediate portion is made so as to be hollow, so that no more than a wall remains as the intermediate portion, after which a major portion of the wall is removed by means of two grooves 18 which run perpendicularly to the axis 5. The remaining portion of the wall forms a bridge 19 which is rotated, near the next groove, through an angle of, for example, 180 degrees about the axis 5.

The lamp vessel 1 of the electric lamp has a relatively small axial dimension of approximately 22 mm and is suitable for consuming a relatively high power of, for example, 5 to 25 W. The electric lamp has a service life of approximately 6000 hours in this case.

In accordance with the invention, at least a part of the lamp vessel 1 is covered with a light-absorbing coating 3 having an average thickness of 2-3 μm.

FIG. 6 shows the electric lamp provided with a support 30, being a reflector with a transparent plate 33 in the drawing, as well as with an adapter 25. In this configuration of a lamp with an adapter and a reflector, where the reflector is provided with a rubber ring 31 retained in a groove 32, the rubber ring seals off the opening 26 between the lamp cap and the reflector in a gastight manner. The adapter is provided with standardized contact points 27 which are passed through the bottom plate 28 of the adapter in a gastight manner and are connected to contact members 14 of the lamp cap 10.

It is visible in the drawing that the lamp cap 10 falls substantially entirely within a cone 36 which has its apex 35 in the centre 4 of the electric element 2 and has an apex half angle alpha of 25 degrees. The light originating from the electric element 2 can reach the reflecting surface 34 substantially without obstruction and is reflected there at least substantially axially in the direction of the transparent plate 33.

The invention claimed is:

1. Cured coating comprising:
   at least one filler,
   a polyalkoxysilane matrix, and
   5.5-40.0% of at least one cured aminosilane,
   wherein % refers to the amount by weight based upon total weight of the cured coating.

2. Cured coating according to claim 1, wherein said at least one cured aminosilane is 5.9-6.9% of the cured coating.

3. Cured coating according to claim 1, wherein said aminosilane is selected from the group consisting of x-alkyl-aminopropyltrialkoxysilanes, with the alkyl group being a methyl-, ethyl- or phenyl- group, with the alkoxy group being a methoxy or an ethoxy group, and with x being selected from the group consisting of 0, 1 and 2.

4. Cured coating according to claim 1, wherein said aminosilane is selected from the group consisting of (N,N-dimethylaminopropyl)-trimethoxysilane, (N,N-dimethylaminopropyl)-triethoxysilane, and mixtures thereof.

5. Cured coating according to claim 1, wherein said filler is selected from the group consisting of organic and inorganic pigments, inorganic fillers, and mixtures thereof.

6. Cured coating according to claim 1, wherein said pigments are selected from the group consisting of zinc-iron oxide, iron oxide, cobalt aluminate, and chromophtal yellow.

7. Cured coating according to claim 1, wherein said matrix is derived from at least one selected from the group consisting of tetraethoxysilane (TEOS), methyltrimethoxysilane (MTMS), methyltriethoxysilane (MTES), phenyltrimethoxysilane (PTMS), and phenyltriethoxysilane (PTES).

8. Cured coating according to claim 1, wherein said coating is in the form of a layer that has a thickness of 1 to 5 μm.

9. Lamp vessel or bulb at least partially provided with at least one cured coating according to claim 1.

10. A coated surface comprising a transparent surface that is coated with the cured coating of claim 1.

11. A device wherein at least part of the device is provided with at least one cured coating comprising:
    at least one filler;
    a polyalkoxysilane matrix; and
    5.5-40.0% of at least one cured aminosilane;
    wherein % refers to the amount by weight based upon total weight of the cured coating.

12. Device according to claim 11, wherein said device comprises at least one of a light-transmitting part or a light-reflecting part.

13. The device of claim 11, wherein said at least one cured aminosilane is 5.9-6.9% of the cured coating.

14. The device of claim 11, wherein said device further comprises a transparent surface that is coated with the cured coating.

15. A process for providing a cured coating onto a substrate, wherein said process comprises:
    providing at least one substrate;
    providing at least one polyalkoxysilane sol-gel hydrolysis mixture;
    providing at least one filler;
    providing at least one aminosilane, in an amount such that the cured coating contains 5.5-40.0% of said cured aminosilane;

mixing said aminosilane and said filler;
mixing the resulting mixture with said sol-gel hydrolysis mixture;
coating said substrate with the resulting mixture; and
curing the resulting coating.

16. The process of claim 15, wherein said cured aminosilane is 5.9-6.9% of the cured coating, wherein % refers to the amount by weight based upon total weight of the cured coating.

17. The process of claim 15, wherein said substrate is a transparent substrate.

* * * * *